United States Patent Office 3,213,053
Patented Oct. 19, 1965

3,213,053
ANTISTATIC COMPOSITION AND TREATMENT OF SYNTHETIC LINEAR POLYMER TEXILES THEREWITH
Lawrence W. Kendrick, Jr., Kinston, N.C., assignor to E. I. du Pont de Nemours and Company, Wilmington, Del., a corporation of Delaware
No Drawing. Filed Feb. 23, 1962, Ser. No. 175,295
8 Claims. (Cl. 260—29.6)

This invention relates to a textile-treating composition and textile material processed therewith. More specifically, the invention relates to a textile treatment to provide antistatic properties.

The newer synthetic textile fibers, for example those prepared from polyethylene terephthalate, polyhexamethylene adipamide, and polyacrylonitrile, as well as others of the polyester, polyamide, and polyacrylic types, possess many desirable properties which have made them commercially acceptable for many end uses, both alone and in various combinations wihin themselves and with the natural fibers. However, the hydrophobic character of these newer fibers makes them susceptible to the development and retention of static electrical charges. This characteristic of developing a static charge is so objectionable in some instances that it has completely prevented otherwise acceptable fibers from penetrating some important markets.

Although many antistatic and antisoiling treating agents have been disclosed in the art, none of these have been satisfactory from the standpoint of both effectiveness and permanence of effect. In particular, no treating agent has been disclosed which may be applied to a hydrophobic fiber or fabric, and which will remain on the fiber through the many fabric processing steps as well as the washing and cleaning treatments which are given to the finished garment by the user. Furthermore, many of the antistatic treating agents are found to adversely affect the handle of the fabric, either imparting objectionable stiffness or disagreeable tactile properties.

Some of the more effective antistatic agents have been prepared from organic polymers containing sulfonate salt groups in the molecule. However, it has been found that these agents are often deactivated by normal dry cleaning treatment since the sulfonate salt groups are neutralized by amine-containing soaps commonly used in the dry cleaning bath.

Other moderately effective antistatic coatings have been built around polymers containing polyethylene oxide chains. However, such agents have been found to accelerate the pick-up of oily soil to the extent that they are not considered useful for most textile materials. Moreover, objectionable staining and deactivation occur as a result of the sorption of sulfonated soaps commonly used in dry cleaning baths.

It is, therefore, an object of this invention to provide textile fibers and fabrics having permanent antistatic surface characteristics. A further object is the provision of synthetic fibers and fabrics having antistatic characteristics which are not neutralized by contact with amine-containing or sulfonate-containing soaps. Another object is the provision of synthetic textile material having antistatic characteristics without a heightened tendency toward the pick-up of oily soil. A still further object is the provision of a novel coating composition useful for imparting antistatic properties to shaped articles prepared from synthetic hydrophobic polymers.

These and other objects are obtained by this invention which provides an antistatic coating composition comprising a new class of organic polymers characterized by the presence in the polymer molecule of (1) a crosslinkable component, (2) an anionic component, and (3) a component containing a polyethylene oxide chain.

In a preferred embodiment, the polymers of this invention are prepared by polymerizing a mixture of (1) a polymerizable vinyl monomer containing a curable methylol or epoxy group, (2) a polymerizable vinyl monomer containing an anionic group, and (3) a polymerizable vinyl monomer containing a polyethylene oxide chain.

Alternatively, a polymerizable vinyl monomer may be used which contains more than one of the necessary components. For example, the polyethylene oxide chain and the crosslinkable component may both be present in one monomeric unit.

As indicated, the polymers used in this invention must contain a reactive group which enables the polymer to be crosslinked after it is appled to a textile material. Epoxy groups and methylol groups are preferred. Epoxy groups may be introduced into the vinyl terpolymer component of the coating composition of this invention by using, as one monomer during an interpolymerization reaction, compounds containing at least one oxirane or 1,2-epoxy group and at least one polymerizable, ethylenically unsaturated bond. Suitable epoxide-containing monomers are exemplified by glycidyl methacrylate, 4-vinylcyclohexane oxide, allyl glycidyl ether, butadiene, monoepoxide, vinyl 2,3-epoxy butyrate, and similar compounds. Alternatively, epoxide groups may be introduced into an existing polymer by standard epoxide-producing reactions carried out at reactive centers on the polymer. Examples of such reactions are oxidations of a double bond with hydrogen peroxide, perbenzoic acid, peracetic acid or ozone and treatment of a halohydrin with strong base. In addition, epoxide groups may be attached to a polymer by coupling reactions involving an epoxide-containing molecule and reactive centers on the polymer. An example of said coupling reaction would be the known interreaction of epichlorohydrin with an hydroxyl group of a polymer, producing a glycidyl group joined to the polymer.

For some purposes, N-methylol acrylamide is an excellent cross-linking component. Alternatively, it may be desirable in certain situations to use acrylamide as the crosslinking component and subsequently convert it to N-methylol acrylamide by treatment with formaldehyde.

The anionic component of the vinyl terpolymer may be provided by employing anionic copolymerizable monomers in the interpolymerization reaction which prepares said terpolymers. The anionic monomers may generally be organic acids or salts of organic acids having a pKa value between 0.4 and 2.5. In a preferred terpolymer, the anionic component ist he alkali metal salt of an aromatic sulfonic acid. Alternatively, vinyl sulfonates may be used. Specific examples of preferred anionic component monomers include potassium styrene sulfonate, sodium styrene sulfonate, sodium isoprpene sulfonate, sodium ethylene sulfonate, triethanolamine styrene sulfonate, and the like. Both alkali metal and alkaline earth metal salts as well as amine salts may be used. Anionic groups may alternatively be introduced into a terpolymer by chemical treatment of reactive centers in a nonionic polymer.

Although the organic sulfonic acids and sulfonate salts are preferred in preparing the vinyl polymers of this invention, it is to be understood that their phosphoric acid analogs may be used with equally advantageous results.

Carboxylic acids and their salts are not effective as components of the terpolymers of this invention.

In addition to the anionic component and the crosslinking component, the terpolymer of this invention must contain a third component which comprises a polyethylene oxide chain. Examples of suitable polymerizable monomers useful as the third component include methoxy- or ethoxy- poly(ethylene glycol) methacrylate, and methoxy- or ethoxy- poly(ethylene glycol) acrylate. The molecular weight of the polyethylene oxide chain may vary from about 100 to about 1500 with best results being obtained in the range 250 to 500.

Suitable monomers having a polyethylene oxide chain may be prepared by reaction of an appropriate alkyloxypolyethylene glycol with methacrylyl chloride in the presence of pyridine in ether solution. For example, into a resin kettle fitted with a stirrer, thermometer, dropping funnel and reflux condenser is placed 1 mol of purified dry methoxypolyethylene glycol (mol. wt. 350), 0.96 mol. of pyridine and 1 pound of anhydrous ether. The kettle is immersed in an ice-salt mixture and cooled to <10° C. To the stirred solution is added 0.95 mol. of freshly prepared methacrylyl chloride diluted with an equal volume of ether, at such a rate as to maintain the temperature below 0° C. After all of the acid chloride is added, the cooling bath is replaced with a 40–45° C. water bath, and the reaction mixture refluxed for 2 hours. At the end of this period the reaction mixture is filtered to remove pyridine hydrochloride, and the solvent removed by evaporation under reduced pressure at a temperature not exceeding 30–35° C.

The new vinyl terpolymers are preferably prepared in an aqueous emulsion polymerization system using free radical catalysts. The polymerization process may be carried out batch-wise or in a continuous reactive system whereby steady state concentrations are maintained during polymerization. Emulsifying agents such as those commonly used in vinyl type polymerizations may be present to stabilize the terpolymer emulsion formed. Alternatively, solution polymerization procedures may be used.

The use of a suitable catalyst in the preparation of the terpolymer of this invention is usually desirable in the polymerization step in order to obtain a reactive speed which is commercially feasible. The various water-soluble peroxygen compounds are particularly suitable in the practice of this invention as are water-soluble aliphatic azo compounds. For example the various peroxides, e.g., urea peroxide, hydrogen peroxide, potassium peroxide, sodium peroxide and the like may be used, or azo - bis - isobutyramide hydrochloride. Other suitable catalysts include sodium persulfate, potassium persulfate, sodium perborate, peracetic acid and the like. Still other catalysts such as complex catalysts made from a ferrous or ferric salt and hydrogen peroxide as disclosed in U.S. Patent No. 2,508,341 may be used. It is also possible to employ water-insoluble oxygen-yielding catalysts such as benzoyl peroxide, tertiary butyl hydroperoxide, lauryl peroxide and acetyl peroxide, and azo compounds. The concentration of catalysts employed is usually very small, e.g., from about 1 to about 20 parts of catalyst per 1000 parts of the reactive mixture. If an inhibitor be present, up to 5% or even more of the catalyst may be necessary according to the concentration of the inhibitor. It is preferable that a neutral initiator or one operable in the pH range 3 to 9 be used in this type of polymerization in order to prevent the premature opening of the epoxide rings of the epoxy-containing monomer.

In the preparation of the vinyl terpolymer of this invention by means of emulsion polymerization where it is desirable to use an emulsifying agent, it is preferred to employ an emulsifier which is not cationic in order that the emulsifier will not detract from or interfere with the formation of an anionic copolymer. Suitable compatible emulsifiers which may be used may be selected from the following types: diamyl, dihexyl, or dioctyl sulfosuccinic esters and salts thereof, salts of alkylated naphthalene sulfonic acids, sulfonated or sulfated higher alcohols, e.g., lauryl sulfate, the salts of the sulfonated or sulfated higher alcohols, sulfonated oils, glycol oleates and linoleates, mineral oil sulfonates, aromatic sulfonates, wax acid soaps, triethanolamine soaps such as the oleate, monoglycerol linoleate, amino sulfonates and sulfates, ammoniacal or other alkaline caseins, soaps, lecithin, cholesterol, saponin, emulsifying gums such as gum arabic, gelatin, or one of the nonionic polyethylene oxide types. Obviously, various mixtures of these emulsifiers and wetting agents may be employed in order to obtain suitable stability of the emulsions. The present invention is not limited to the use of any particular proportion of emulsifying agent. In general it is preferred to use from 1 to 5% of the emulsifying agent based on the weight of the monomers to be emulsified, but commercially attractive stable emulsions may be obtained if this figure is varied from 0.1% to 25%. The optimum concentration depends primarily upon the materials to be emulsified although other factors such as agitation have a decided effect.

Although the relative amounts of the three monomers making up the terpolymer of this invention may vary over wide ranges, it is generally desirable for the terpolymer to contain 30–70% of the anionic component, 5–20% of the crosslinking component, and 10–65% of the component containing polyethylene oxide units. For the best balance of properties for use on synthetic textile materials, the preferred terpolymer contains 35–55% of the anionic component, 5–10% of the crosslinkable component, and 35–60% of the polyethylene oxide component. The above percentage figures refer to weight percent based upon the total weight of the terpolymer.

Within the above limits, resistance to deactivation by amine soaps is increased by increasing the percentage concentration of the polyethylene oxide component. Resistance to pick-up of soil and deactivation by sulfonate soaps is increased by increasing the percentage composition of the anionic component.

Preferably, the terpolymers of this invention are applied directly to textile materials without further chemical modification and cured by heat alone. Alternatively, a catalyst such as zinc fluoroborate may be added in order to cure the terpolymer at a lower temperature. Or if desired, the terpolymer may be applied to the textile material along with a crosslinking agent, as, for example, a polyamine or a polyisocyanate. The use of polyamines and polyisocyanates for curing epoxy polymers is well known in the art and many such agents are commercially available.

The coating composition is generally applied to fibers and fabrics from an aqueous dispersion. The term "aqueous dispersion" is intended to mean that the active ingredients of the coating composition are either dissolved in or suspended in a liquid medium which is at least 75% water. The dispersion may be a true solution, an emulsion, or the like. Other solvents which may be mixed with the water of the dispersing medium in amounts up to 25% include the alcohols, ketones, and water-soluble esters. For example, the dispersing medium may contain up to 25% tertiary butanol, acetone, methanol, or dioxane.

If a crosslinking agent is used, the terpolymer and crosslinking agent may be applied to the textile material from separate dispersions in consecutive steps, in any order, with good results. However, in some circumstances, it is prefered to use a single dispersion containing both the terpolymer and the crosslinking agent.

In the application of the treating composition to a textile fiber, filament, fabric, or other form of the textile material to be treated, the composition is applied in amount to give the desired antistatic and antisoiling properties. This amount may be very small, as within the range 0.2 to 5% of the weight in the textile being treated. Larger proportions than 5% are unnecessary and uneconomical. In commercial treatments, ordinarily about 0.5 to 3.0% of the treating composition is used based on the weight of the textile material. The amount required varies with the kind of textile treated and is less, although within the broad range stated, for materials which are less hydrophobic than polyhexamethylene adipamide and polyethylene terephthalate which are particularly susceptible to receiving a static charge.

At times the terpolymer emulsions of this invention are quite viscous, even approaching the consistency of a gel. For these emulsions a viscosity depressant may be added, since viscous materials are difficult to apply uniformly. A dramatic reduction in viscosity is obtained by adding to the emulsion a polyvalent metal salt such as zinc sulfate or barium hydroxide. Metal salt concentrations as high as 20% or more, based upon weight of terpolymer, may be used if desired.

The effects of the development and retention of a static charge in a textile fabric are apparent to the wearer of the fabric in the clinging of the garment to the wearer and in the pickup of lint. A laboratory test which correlates well with actual wearing experience consists of measuring the direct current resistance of the fabric at 30% relative humidity. High values expressed as the logarithm (base 10) of the resistance in ohms (termed log R) indicate that the fabric will readily acquire and retain a static charge. Conversely, a low value indicates that the fabric will not readily acquire and retain a static charge.

Static was also measured in some cases by applying a high voltage to sample and measuring the time for half of charge to decay to ground and atmosphere ($t_{1/2}$). Control polyethylene terephthalate fabrics give >2400 sec. in this test. Values of 200 sec. or less indicate good static performance as evidenced by freedom from static in subjective tests.

The following examples are cited to illustrate the practice of this invention and are not intended to limit the scope thereof.

EXAMPLE I

To a polymerization vessel is added 60 grams of sodium styrene sulfonate, 75 grams of methoxypoly(ethylene glycol) methacrylate in which the poly(ethylene glycol) chain has an average molecular weight of 350, 15 grams of freshly distilled glycidyl methacrylate, 1106 ml. of distilled water buffered at pH 6.5, and 1 gram of glycerol monooleate. The mixture is emulsified by high speed stirring. To the emulsion is added 0.62 gram of α,α'-azodiisobutyroamidine hydrochloride and 0.1%, based upon total weight of monomers, of dodecyl mercaptan. The system is flushed with nitrogen and then heated at 64° C. for 3 hours. The resultant product is an aqueous dispersion containing 15% solids. The polymer product is shown to have retained active epoxide groups.

Coating compositions are prepared from the above polymer dispersions by diluting the mixture with water to give the desired solids concentration.

EXAMPLE II

The terpolymer emulsion similar to that of Example I, diluted to 1.5% solids, is applied to a tow composed of crimped oriented filaments of polyethylene terephthalate. The tow is immersed in the terpolymer emulsion and then passed through a pair of squeeze rollers to remove excess solution, giving a total wet pick-up of 100%. The tow is then dried in a hot air oven at 145° C. and cut into staple lengths of 2¾ inches. The treated staple is spun into yarn using the well known worsted system, and the yarn is woven into a tropical fabric. The fabric is scoured and then dyed with a dispersed dye following normal procedures for dyeing polyethylene terephthalate, and then heat-set on a tenter frame at 175% C. When tested for static propensity, the fabric is found to have a $t_{1/2}$ value of 1 to 2 sec. (5 samples).

The above fabric is subjected to a series of 25 simulated home launderings, consisting of a machine wash followed by tumble drying, and then tested for static propensity. The test result gives a $t_{1/2}$ value of 3¾ seconds.

Another sample of the fabric is subjected to 8 dry cleanings using perchloroethylene as the solvent, along with a small amount of a mahogany oil soap. After drying, the fabric is found to have a $t_{1/2}$ value of ¾ second.

A control fabric prepared in the same way and tested in the same way as above, but having no vinyl terpolymer applied, is found to give $t_{1/2}$ values greater than 1000 seconds.

EXAMPLE III

A series of vinyl terpolymers of various compositions are prepared from sodium styrene sulfonate, methoxypoly(ethylene glycol) methacrylate, and glycidyl methacrylate, following the general procedure of Example I. Each preparation is diluted to about 2% solids and then applied by normal padding procedure to samples of a tropical fabric composed of filaments of a copolymer of polyethylene terephthalate containing 2 mol percent of the sodium salt of 5-sulfoisophthalic acid. After squeezing to approximately 100% wet pick-up, the fabric samples are cured at 145° C. for approximately 15 minutes. The percent loading of terpolymer on the fabric is determined by weight increase of the sample. Each sample is then scoured in a .3% sulfated alcohol solution at 70° C. for 30 minutes, rinsed, dried, and then tested for static propensity. These results are shown in Table I.

The above-prepared samples are then subjected to a series of simulated home launderings in which the samples are machine washed in a solution containing 0.15% "Tide" (trademark of Procter & Gamble Co.) using a temperature of about 65° C. for 20 minutes. After rinsing in warm water, the samples are tumbled dry in an automatic dryer at about 80° C. for 20 minutes. Static propensity is measured after 5 such treatments and again after 10 treatments, with the results shown in Table I. The abbreviation SSS/PEGM/GMA at the top of column 1 in the table refers to terpolymers prepared from sodium styrene sulfonate, methoxypoly(ethylene glycol)methacrylate, and glycidyl methacrylate.

*Table I*

| SSS/PEGM/GMA, weight percent composition | Scoured | | | After X simulated launderings | | | |
|---|---|---|---|---|---|---|---|
| | | | | 5X | | 10X | |
| | Percent load | Log R | $T_{1/2}$ | Log R | $T_{1/2}$ | Log R | $T_{1/2}$ |
| 26/69/5 | 1.99 | 11.9 | | 12.0 | | 12.6 | |
| 30/60/10 | 1.74 | 12.5 | | 13.1 | 46 | 12.5 | 27 |
| 50/40/10 | 1.69 | 11.9 | | 12.7 | 15 | 12.6 | 11 |
| 50/40/10 | 1.24 | 11.7 | 1¼ | 12.1 | 2½ | 12.2 | 4 |
| 40/50/10 | 0.53 | 12.5 | 11 | 13.1 | 20 | 13.4 | 81 |
| 55/35/10 | 0.54 | 11.9 | 1½ | 12.5 | 2 | 13.6 | 45 |
| 50/40/10 | 1.52 | 11.6 | ¾ | 12.1 | 1 | 12.6 | 3 |
| 55/35/10 | 1.49 | 9.7 | ½ | 12.0 | 1¼ | 13.1 | 11 |
| 35/55/10 | 1.47 | 11.4 | 2 | | 1½ | | 12 |
| 40/50/10 | 1.67 | 11.8 | 2 | | ½ | | 4 |
| 45/45/10 | 1.65 | 11.4 | 1 | | ¾ | | 2 |
| 50/40/10 | 1.87 | 11.5 | ½ | | <½ | | 1½ |
| Control | None | >15 | >2,400 | >15 | >2,400 | >15 | >2,400 |

EXAMPLE IV

Fabric samples are treated with antistatic agent as in Example III and then subjected to a series of simulated dry cleanings. The dry cleaning treatment consists of placing the fabric sample in a solution of perchloroethylene, containing 4% of a dry cleaning soap, for about 30 minutes at room temperature. Two commercial dry cleaning soaps are used: "886" (trademark of R. R. Street & Co.) and "Perksheen" (trademark of Adco Chemical Co.). The samples are then rinsed twice in fresh perchloroethylene and tumble dried at about 80° C. The samples are tested for static propensity after one such treatment and after a series of four such treatments. The results are shown in Table II. The abbreviation SSS/PEGM/GMA at the top of column 1 in the table refers to terpolymers prepared from sodium styrene sulfonate, methoxypoly(ethylene glycol)methacrylate, and glycidyl methacrylate.

*Table II*

| SSS/PEGM/GMA, weight percent composition | After "Duponol"* scour | | | After X simulated dry cleanings | | | | | | | |
|---|---|---|---|---|---|---|---|---|---|---|---|
| | | | | 1X "886" | | 1X "Perksheen" | | 4X "886" | | 4X "Perksheen" | |
| | Percent load | Log R | $T_{1/2}$ | Log R | $T_{1/2}$ | Log R | $T_{1/2}$ | Log R | $T_{1/2}$ | Log R | $T_{1/2}$ |
| 26/69/5 | 1.51 | 12.1 | | 13.6 | | 12.0 | | 13.9 | | 11.2 | |
| 30/60/10 | 1.81 | 12.8 | | 12.6 | 11 | 12.3 | 7 | 12.5 | 13 | 12.1 | 4 |
| 50/40/10 | 1.76 | 12.1 | | 12.3 | 4 | 12.2 | 1½ | 12.1 | 3½ | 12.4 | 4 |
| 40/50/10 | 1.73 | 12.3 | 8 | | 14 | | 1½ | >15 | 93 | 11.8 | 2½ |
| 55/35/10 | 1.88 | 11.5 | 1 | | ¾ | | 1½ | 11.5 | ½ | 11.7 | 2½ |
| 50/40/10 | 1.38 | 11.7 | 1½ | 11.4 | ¾ | 11.4 | 1 | 12.1 | 2 | 11.5 | 1 |
| 50/40/10 | 1.80 | 11.6 | ¾ | 11.8 | ½ | 11.5 | ½ | 11.5 | 1 | 11.6 | 1 |
| 35/55/10 | 1.72 | 11.9 | 8 | | 6½ | | <½ | | 21 | | <½ |
| 40/50/10 | 1.67 | 12.5 | 7 | | 3 | | <½ | | 12 | | <½ |
| 45/45/10 | 1.65 | 12.0 | 5½ | | ½ | | <½ | | 1 | | 1 |
| 50/40/10 | 1.87 | 12.2 | 2 | | <½ | | <½ | | <½ | | <½ |
| Control | None | >15 | >2,400 | >15 | >2,400 | >15 | >2,400 | >15 | >2,400 | >15 | >2,400 |

*Du Pont's registered trademark for its surface active agents.

The vinyl terpolymers of this invention may be applied to all types of synthetic hydrophobic polymers in the form of fibers and films with good results. Particularly good antistatic properties are imparted to polyesters such as polyethylene terephthalate and polyhexahydro-p-xylylene terephthalate, to polyamides such as polyhexamethylene adipamide and polycaproamide, and to acrylic polymers such as polyacrylonitrile. The application of the vinyl terpolymers of this invention to hydrophobic fibers and films not only imparts permanent antistatic properties to these fibers and films, but also achieves these advantages without the loss of any of the desirable physical properties inherent in those fibers and films. For example, the superior handle and wash-wear properties of fabrics prepared from polyethylene terephthalate are not impaired.

An outstanding advantage of the antistatic vinyl terpolymers of this invention is the fact that coatings prepared from these terpolymers are resistant both to the pick-up of oily soil and to deactivation by amine-containing soaps. Furthermore, these coatings are resistant to deactivation by hard water, i.e., water containing high concentrations of calcium ion, a factor which is important for any textile material which is designed for home laundering. An an added advantage, it is to be noted that the terpolymer coatings of this invention do not become yellowed when heated repeatedly, a disadvantage of many coatings of the prior art.

The antistatic coatings of this invention exhibit outstanding durability to laundering, dry cleaning, and to mechanical abrasion. Therefore, these coatings, if desired, may be applied by the fiber producer to the synthetic fiber in the form of staple, tow, or continuous filaments, and will remain upon the fiber during normal fiber processing treatments, during the preparation of fabrics, and throughout the life of the fabric.

Although the coating compositions of this invention have been described in terms of application to filaments, tow, and woven fabrics, they may also be applied to knitted fabrics, nonwoven fabrics, felts and to other shaped articles such as films, rods, bristles, and the like. The coating composition may be applied by spraying, roller coating, brushing, dipping, or other suitable means.

As many variations of this invention will be apparent to those skilled in the art without departing from the spirit and scope thereof, it is to be understood that this invention is not limited to the specific embodiments thereof except as defined in the appended claims.

I claim:

1. As a new article of manufacture a synthetic linear polymer fiber having a superficial coating of a terpolymer prepared by polymerizing a mixture of (1) a vinyl monomer containing a curable group selected from the class consisting of methylol and epoxy groups, (2) a vinyl monomer containing an anionic group, and (3) a vinyl monomer, containing a polyethylene oxide chain of molecular weight from 100 to 1500, selected from the class consisting of methoxypoly(ethylene glycol)methacrylate, ethoxypoly(ethylene glycol)methacrylate, methoxypoly(ethylene glycol)acrylate and ethoxypoly(ethylene glycol)acrylate.

2. An article as defined in claim 1 in which the anionic vinyl monomer is an organic acid salt having a pKa value between 0.4 and 2.5.

3. An article as defined in claim 1 in which the anionic vinyl monomer is an alkali metal salt of an aromatic sulfonic acid.

4. An article as defined in claim 1 in which the coating is a terpolymer of 5% to 20% of vinyl monomer (1), 30% to 70% of vinyl monomer (2) and 10% to 65% of vinyl monomer (3), the percentages being by weight based on the total weight of the terpolymer.

5. An article as defined in claim 1 in which the coating is from 0.2% to 5% of the weight of the synthetic linear fiber.

6. The process which comprises polymerizing a mixture of (1) a vinyl monomer containing a curable group selected from the class consisting of methylol and epoxy groups, (2) a vinyl monomer containing an anionic group, and (3) a vinyl monomer, containing a polyethylene oxide chain of molecular weight from 100 to 1500, selected from the class consisting of methoxypoly(ethylene glycol)methacrylate, ethoxypoly(ethylene glycol)methacrylate, methoxypoly(ethylene glycol)acrylate and ethoxypoly(ethylene glycol)acrylate, and applying the terpolymer to synthetic linear polymer fiber to form a coating which is from 0.3% to 3% of the weight of the fiber.

7. The process which comprises applying to a synthetic linear fiber a terpolymer prepared by polymerizing a mixture of (1) 5% to 10% of glycidyl methacrylate, (2) 35% to 55% of an alkali metal salt of styrene sulfonate and (3) 35% to 60% of methoxypoly(ethylene glycol)

methacrylate wherein the poly(ethylene glycol) chain has a molecular weight from 250 to 500, the percentages being by weight based on the total weight of the terpolymer.

8. A coating composition comprising an aqueous dispersion of a crosslinkable terpolymer of (1) 5% to 10% of glycidyl methacrylate, (2) 35% to 55% of an alkali metal salt of styrene sulfonate and (3) 35% to 60% of methoxypoly(ethylene glycol)methacrylate wherein the poly(ethylene glycol) chain has a molecular weight from 250 to 500, the percentages being by weight based on the total weight of the terpolymer.

References Cited by the Examiner

UNITED STATES PATENTS

| | | | |
|---|---|---|---|
| 2,676,896 | 4/54 | Cohen et al. | 260—79.3 |
| 2,702,795 | 2/55 | Gilwood | 260—79.3 |
| 2,723,256 | 11/55 | Hayek | 260—79.3 |
| 2,761,856 | 9/56 | Suen et al. | 260—79.3 |
| 2,825,711 | 3/58 | Mayfield | 260—79.3 |
| 2,897,170 | 7/59 | Gruber | 117—139.5 |
| 2,973,263 | 2/61 | Kaszuba et al. | 117—161 |
| 3,008,215 | 11/61 | Pitts | 117—139.5 |
| 3,010,929 | 11/61 | Jones | 260—79.3 |
| 3,021,232 | 2/62 | Pretka | 117—139.5 |
| 3,026,270 | 3/62 | Robinson | 260—2 |
| 3,062,686 | 11/62 | Graulich | 117—139.5 |
| 3,090,704 | 5/63 | Collins et al. | 177—139.5 |

WILLIAM H. SHORT, *Primary Examiner.*

JOSEPH R. LIBERMAN, *Examiner.*